W. H. SPARKS.
Axles and Sleeves for Vehicles.

No. 141,018. Patented July 22, 1873.

WITNESSES
Thomas J. Bewley.
Harry C. Benners

INVENTOR.
William H. Sparks
By His Attorney
Stephen Ustick

UNITED STATES PATENT OFFICE.

WILLIAM H. SPARKS, OF ABSECOM, ASSIGNOR OF ONE-HALF HIS RIGHT TO JAMES D. SOUDER, OF WILLIAMSTOWN, NEW JERSEY.

IMPROVEMENT IN AXLES AND SLEEVES FOR VEHICLES.

Specification forming part of Letters Patent No. 141,018, dated July 22, 1873; application filed October 17, 1872.

*To all whom it may concern:*

Be it known that I, WILLIAM H. SPARKS, of Absecom, in the county of Atlantic, in the State of New Jersey, have invented certain Improvements in Axles, of which the following is a specification:

My invention relates to the following particulars: The axle at each end is provided with a shoulder, against which a sleeve, which has a tapered bore, is held by means of a screw on the end of the axle, so as to act auxiliary with the taper of the sleeve to give the latter a firm connection with the axle to prevent its turning thereon. The sleeve has a tapered enlargement at its inner end parallel with the taper of its main portion for increasing its strength at that point, and at which it is liable to break without such provision when subjected to a sudden strain. To give greater security to the fastening of the sleeve upon the axle, preventing its slipping therefrom if the nut should work off, the screw-thread for securing the nut is extended inward, and engages with a female screw in the outer end of the sleeve, as hereinafter described.

Figure 1:
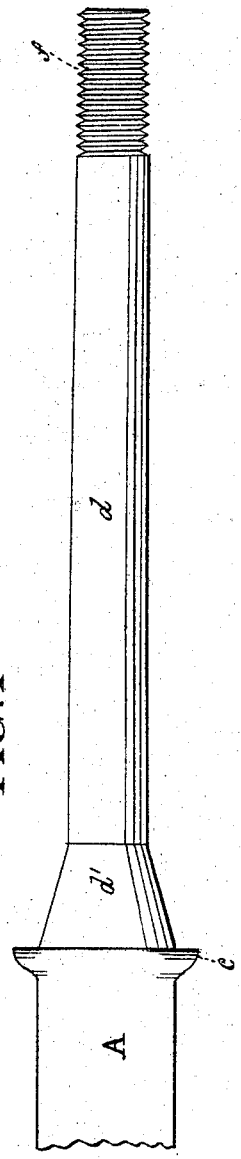
Figure 2:
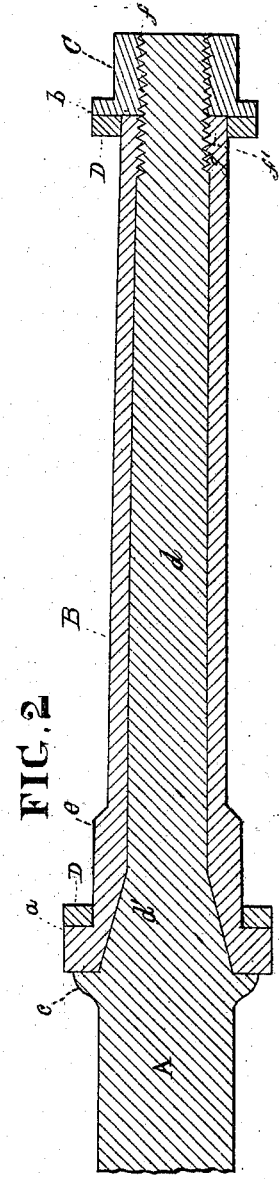

Figure 1 is a side view of an end portion of an axle, A. Fig. 2 is a longitudinal section through the axle A and sleeve B.

A represents an end portion of the axle. B is the sleeve; C, the nut, and D the washers, one of which rests against the shoulder $a$ of the sleeve, and the other against the flange $b$ of the nut. The axle is provided, at each end, with a shoulder, $c$, against which the inner end of the sleeve is held by means of the nut C, for tightening the same, in addition to being pressed against the taper of the axle. The portions $d$ $d'$ of the axle with which the sleeve B is connected are round, as represented in Fig. 1. The part $d$ is slightly tapered, as in ordinary axles, and the sleeve is of corresponding form. On the inner end of the sleeve B there is an enlargement, $e$, for the purpose of increasing its strength to prevent its breaking by a sudden strain. The enlargement is of the same taper as the main portion of the sleeve. The screw $f$ on the end of the axle, which secures the nut C, is extended inward, and connects with the thread $f'$ in the diminished bore, at $g$, of the outer end of the sleeve, to keep the latter securely in position if the nut should work loose.

I claim as my invention—

1. The axle A, having, at each end, a collar, $c$, and conical enlargement $d'$, in combination with the sleeve B, having a corresponding conical cavity and an enlargement, $e$, to increase strength, substantially as and for the purpose set forth.

2. The combination of the nut C with the sleeve B, having a screw-thread, $f'$, and the axle, having a screw-thread, $f$, for securing the sleeve against the collar $c$ and enlargement $d'$, substantially as set forth.

WILLIAM H. SPARKS.

Witnesses:
THOMAS J. BEWLEY,
STEPHEN USTICK.